(12) United States Patent
Wilkinson et al.

(10) Patent No.: US 10,333,196 B2
(45) Date of Patent: Jun. 25, 2019

(54) ANTENNA APPARATUS

(71) Applicant: ALEIS PTY LTD, Jandowae, Queensland (AU)

(72) Inventors: Benjamin Thomas John Wilkinson, Redland Bay (AU); Patrick Bernard Gunston, Mount Gravatt East (AU)

(73) Assignee: ALEIS PTY LTD, Jandowae, Queensland (AU)

( * ) Notice: Subject to any disclaimer, the term of this patent is extended or adjusted under 35 U.S.C. 154(b) by 0 days.

(21) Appl. No.: 15/572,149

(22) PCT Filed: May 2, 2016

(86) PCT No.: PCT/AU2016/050317
§ 371 (c)(1),
(2) Date: Nov. 6, 2017

(87) PCT Pub. No.: WO2016/176728
PCT Pub. Date: Nov. 10, 2016

(65) Prior Publication Data
US 2018/0131074 A1    May 10, 2018

(30) Foreign Application Priority Data
May 6, 2015    (AU) .................. 2015901626

(51) Int. Cl.
*G08B 13/14*    (2006.01)
*H01Q 1/22*    (2006.01)
(Continued)

(52) U.S. Cl.
CPC ......... *H01Q 1/2216* (2013.01); *A01K 11/006* (2013.01); *H01Q 7/06* (2013.01)

(58) Field of Classification Search
CPC ....... H01Q 1/2216; H01Q 7/06; A01K 11/006
(Continued)

(56) References Cited

U.S. PATENT DOCUMENTS 4,134,538 A    1/1979    Lagarde et al.
5,175,419 A    12/1992    Yamashita
(Continued)

FOREIGN PATENT DOCUMENTS

GB        1292380 A      10/1972
WO     WO 2004026025 A1 *  4/2004    ........... A01K 11/006
(Continued)

OTHER PUBLICATIONS

Foreign Communication From a Related Counterpart Application, International Search Report and Written Opinion dated Jun. 16, 2016, International Application No. PCT/AU2016/050317, filed on May 2, 2016.
(Continued)

*Primary Examiner* — Tanmay K Shah

(57) ABSTRACT

An antenna apparatus includes a structure configured to mount within a stock race to permit animals to pass therethrough. One or more antenna coils are attached to or within the structure and provide a magnetic field laterally across the structure. The coils may be arranged in a Helmholtz configuration to provide a substantially uniform field in a read zone. The structure may have an open top and the side walls of the structure may be slanted forwards.

20 Claims, 4 Drawing Sheets

(51) Int. Cl.
*H01Q 7/06* (2006.01)
*A01K 11/00* (2006.01)
(58) Field of Classification Search
USPC ........................................... 340/572.1
See application file for complete search history.

(56) References Cited

U.S. PATENT DOCUMENTS

| | | | | |
|---|---|---|---|---|
| 2009/0213023 | A1* | 8/2009 | Gunston | A01K 11/006 343/788 |
| 2013/0244700 | A1* | 9/2013 | Elias | G01B 7/003 455/456.6 |

FOREIGN PATENT DOCUMENTS

| | | | |
|---|---|---|---|
| WO | WO2004026025 | A1 | 4/2004 |
| WO | WO2007033407 | A1 | 3/2007 |
| WO | WO2016176728 | A1 | 11/2016 |

OTHER PUBLICATIONS

Foreign Communication From a Related Counterpart Application, International Preliminary Report on Patentability dated Sep. 4, 2017, International Application No. PCT/AU2016/050317, filed on May 2, 2016.

Pluth, D. et. al "13.56 MHz RFID Power System"; pp. 1-16; May 14, 2004 <url:http://www.engr.sjsu.edu/rkwok/projects/shopcart2B.pdf>.

Csurgai, P. et. al, "Advanced Sensitivity Measurement of Low Frequency RFID Transponder Coils"; Acta Technica Jaurinensis, vol. 3. No. 1, pp. 87-98; 2010.

Ciudad, D. et. al, "RFID in Metal Environments: An Overview on Low (LF) and Ultra-Low (ULF) Frequency Systems", pp. 181-197, Feb. 2010 <url: http://cdn.intechopen.com/pdfs-wm/8465.pdf>.

Foreign Communication From a Related Counterpart Application, European Search Report dated Apr. 26, 2018, European Application No. 16788954.2.

* cited by examiner

ANTENNA APPARATUS

CROSS-REFERENCE TO RELATED APPLICATIONS

The present application is a filing under 35 U.S.C. 371 as the National Stage of International Application No. PCT/AU2016/050317, filed May 2, 2016, entitled "ANTENNA APPARATUS," which claims the benefit of and priority to Australian Application No. 2015901626, filed with the Intellectual Property Office of Australia on May 6, 2015, both of which are incorporated herein by reference in their entirety for all purposes.

FIELD

This invention generally relates to an antenna apparatus, particularly though not solely to an antenna apparatus for identifying farm animals proceeding through a race.

BACKGROUND

Low frequency RFID devices may be used to identify farm animals. The RFID device is interrogated (read) by a suitable reader that incorporates an antenna.

A number of problems can arise where the interrogation occurs as animals move through a stock race. Animals may baulk upon seeing a tag reader above the race, and may hesitate, run backwards, or jump out of the race. As well as causing race inefficiency, the animals may be hurt or undesirably stressed by this process.

A further problem that can occur in animal identification systems is that two or more animals' heads, and therefore also their tags, may enter or be present in a read zone of an antenna at the same time. This can cause a tag collision and may result in one or more tags not being read. This can occur when animals follow each other too closely or when animals do not move through the reader in single file, and is especially a problem with a mixture of different sized animals.

The present invention may provide an improved antenna apparatus, or may at least provide the public with a useful choice.

SUMMARY

According to an exemplary embodiment there is provided an antenna apparatus comprising
a structure configured to mount within a stock race to permit animals to pass therethrough;
one or more antenna coils attached to or within the structure configured to provide a magnetic field laterally across the structure, substantially in a zone through which an interrogatable identification device attached to each animal will pass; and
a controller configured to receive an identification signal for each animal passing through the magnetic field based on an interrogation of each identification device passing therethrough.

According to a further embodiment there is provided a method of manufacturing an identification device reader for a stock race comprising
forming a flat structure,
providing electromagnetic coils in the structure, and
shaping the structure into a U, V, truncated V or frustoconical 3D shape According to a still further embodiment there is provided an apparatus comprising:
a structure configured to mount within a stock race to permit animals to pass therethrough and having an open top; and
one or more antenna coils attached to or within the structure configured to provide a magnetic field laterally across the structure, substantially in a zone through which an interrogatable identification device attached to each animal will pass.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any document in this specification does not constitute an admission that that document is prior art, is validly combinable with any other document or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Figure 1:
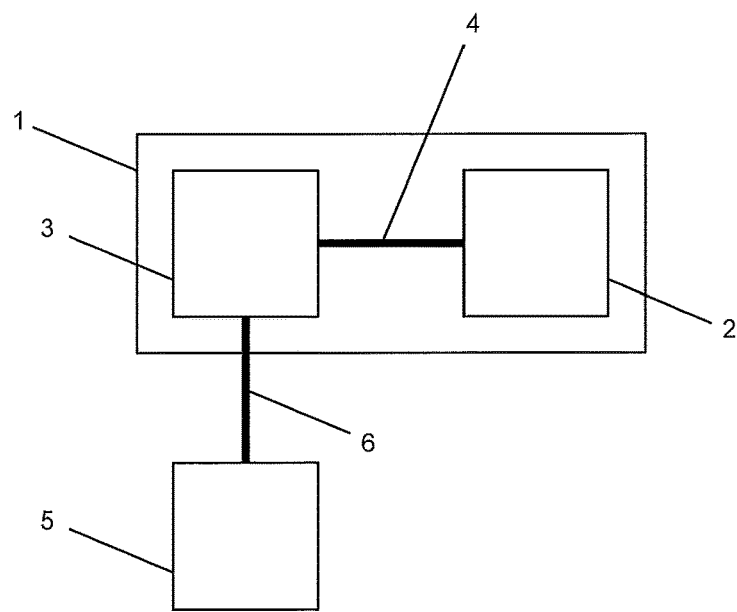
FIG. 1 is a block diagram of an antenna apparatus according to an example embodiment.

FIG. 1 shows a block diagram of an antenna apparatus 1. The antenna apparatus 1 includes a reader 2 and a controller 3. The reader 2 and controller 3 are connected by a reader interface 4. Antenna apparatus 1 may be attached to additional devices 5 through additional interfaces 6.

Figure 2:
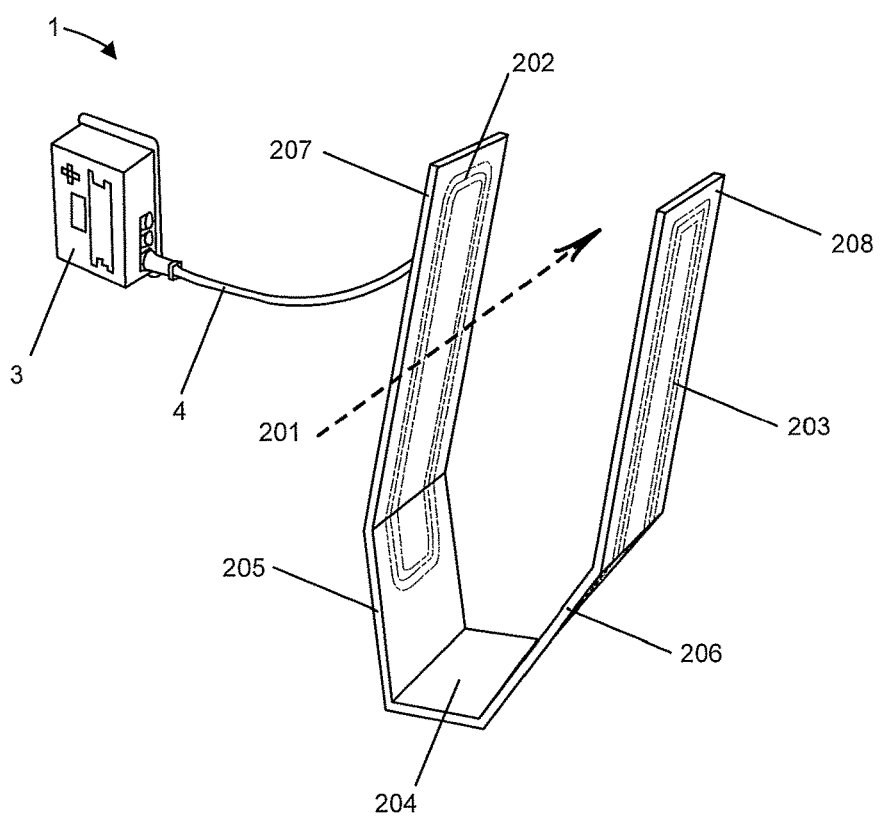
FIG. 2 is a perspective view of the antenna apparatus.
Figure 3:
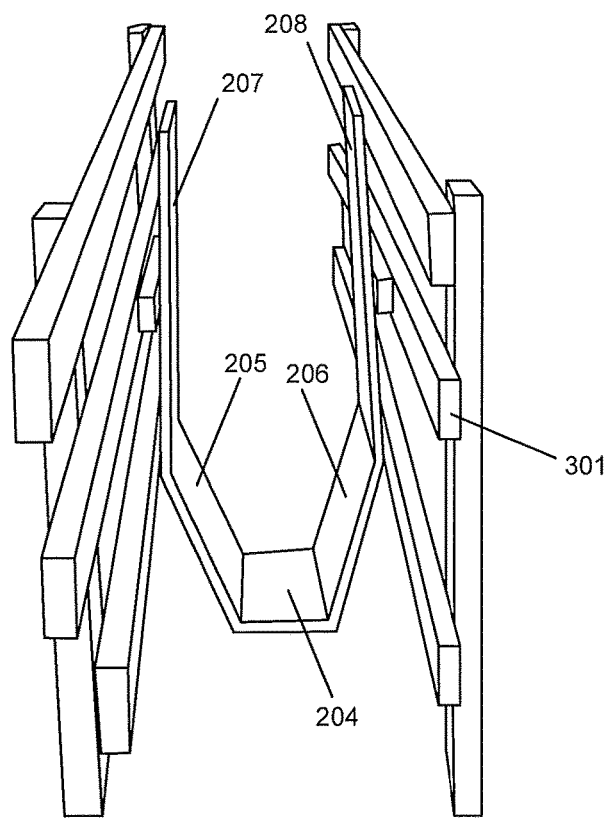
FIG. 3 is a perspective view of the antenna apparatus in the stock race.
Figure 4:
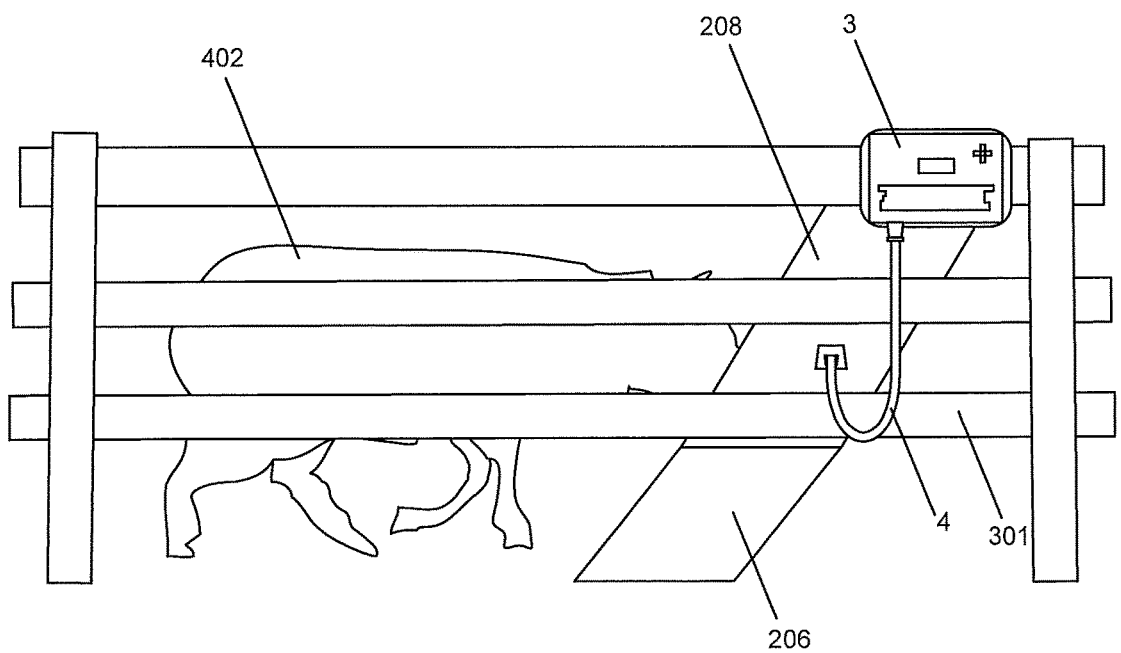
FIG. 4 is a side view of the antenna apparatus in the stock race.

An example implementation is shown in FIGS. 2 to 4. The antenna apparatus 1 is provided within a stock race 301 and connected to controller 3 through reader interface 4. Animals may be collected in a yard, with each having an identification device or tag affixed, usually to the ear, within the rumen, or to an ankle band or other such fitting. Each animal travels a path 201 through a detection space in single file. The space above the antenna apparatus 1 is unobstructed, which minimises animals baulking or slowing as they go through. The open top also allows an operator to walk through stock race 301 easily without needing to climb out of the race 301 or to duck underneath. The antenna apparatus 1 may thus be more efficient and/or more convenient.

The antenna apparatus 1 includes a left coil 202 and a right coil 203. These coils 202, 203 are preferably in parallel planes and may be co-axial. A controller 3 energises each of these coils 202, 203 with an electric current to generate a magnetic field. The tag includes a passive RFID device, which absorbs enough energy while passing the field to radiate an identification signal. The identification signal is detected by the coils 202, 203 and passed to the controller 3. The controller receives and may interpret or decode the identification signal. The controller 3 then registers the identity of the animal and records it into a database. A timestamp may also be recorded for each animal. This data may be used to log which animals have been treated with medicaments, to count the number of animals in a flock, and/or may be used in conjunction with in race weigh scales. The data may also be used to help fulfil governmental regulations in reporting animal movements. An example of an in-race tag detection system is disclosed in U.S. Pat. No. 8,154,465, the contents of which are incorporated herein by reference.

Looking from the front, or down the race, as in FIG. 3, the structure of the antenna apparatus 1 is substantially U shaped including a base panel 204, a left angled panel 205, a right angled panel 206, a left side panel 207 and a right side panel 208. Looking from the side, as in FIG. 4, the right side panel 208 extends from the right angled panel 206, and both panels are slanted. Similarly, the left side panel 207 extends from the left angled panel 205, and both panels are slanted. An animal 402 eg: sheep is shown passing through the reader 2. Typically the animals may be between 30 centimeters and 100 centimeters in height. In some cases, side panels 207, 208 are as tall as or taller than the animals being measured. However, accurate tag reading may still be possible when the side panels 207, 208 do not reach as high as the height of the animals, as the magnetic field may continue above the height of the side panel. For example the side panels 207, 208 may reach a vertical height of 90 centimeters above the ground when the reader 2 is installed in a stock race.

The base panel 204 lies flat on the dirt floor of the stock race 301, and may be 165 mm in width when measured along its front edge. In the case of permanent installations, the side panels 207, 208 may be attached to the stock races 301, 401 by bolts. These bolts may pass through the side panels 207, 208 in approved locations. In the case of temporary installations, the reader 2 may have a side bracket to hook onto the rail of the race 301.

Figure 5:
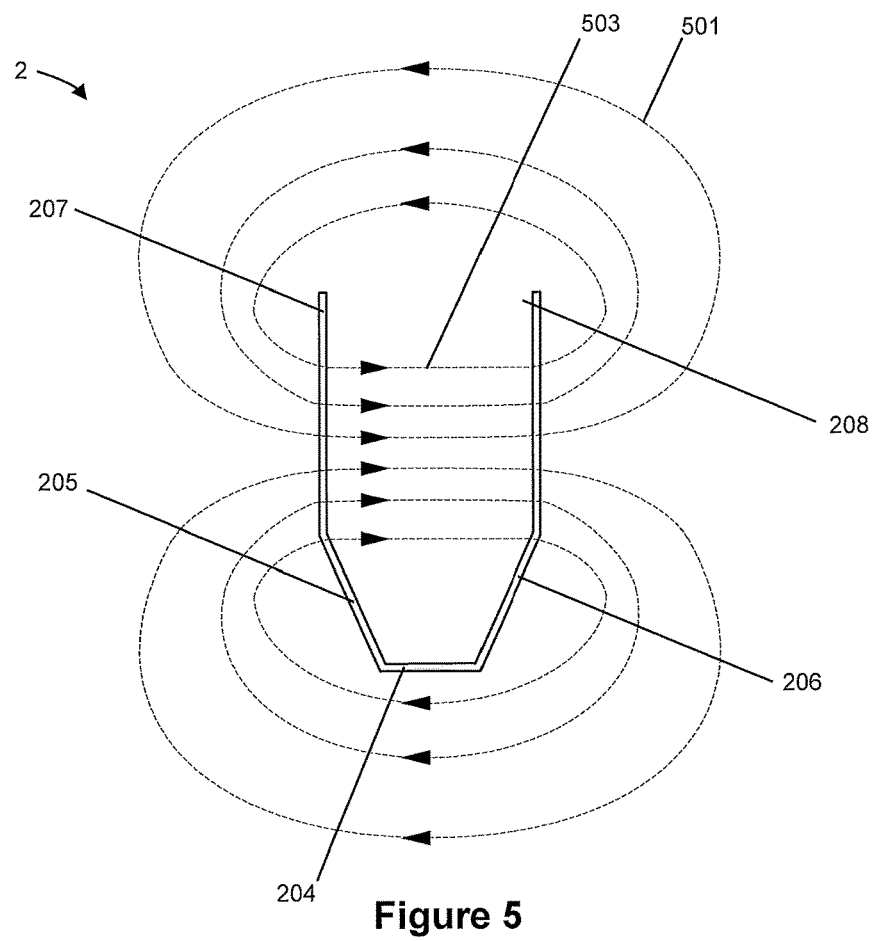
FIG. 5 is a graph of the magnetic field.

An example of the magnetic field 501 is shown in FIG. 5. The left coil 202 is driven to create a magnetic field with the same magnitude and frequency as the right coil 203, such that magnetic fields generated by the left coil 202 and the right coil 203 reinforce each other in the area between the coils 202, 203 eg: in phase. This creates a region of uniform magnetic field 503 for reading an RFID tag, in the area between the coils 202, 203, sometimes referred to as a Helmholtz configuration.

The shape and length of the coils 202, 203 may depend on the size of the animals that will use the antenna apparatus 1 and the location of the identification device. While the magnetic field is concentrated within the boundaries of the antenna apparatus 1, the field will extend beyond the boundaries. The left coil 202 and the right coil 203 create a field which covers the height of the head of an animal passing through the antenna apparatus 1, but as the animal can place its head at a range of heights as it travels through the antenna apparatus 1, the field is made large enough to cover this movement accounting for different sized mature and juvenile animals.

The space in which an RFID tag can be read in is called the read zone 503. When two or more RFID tags enter or are present in the read zone simultaneously, read errors can occur. Typically, RFID tags are attached through the ears of each animal. Thus in prior art readers with vertical orientation, multiple animals are sometimes able to jamb their heads in the reader at the same time and cause a read error.

In order to avoid this, the angled panels 205, 206 restrict the passage enough to ensure that all animals are in single file. When used for sheep, the angled panels 205, 206 may be around 330 mm in length when measured along their front edge, and may be angled at between 20°-60° from vertical, for example, 30° with respect to vertical, such that the distance between the side panels 207, 208 is around 450 mm.

As the head of a sheep is approximately 20 centimeters in front of the feet, the left side panels 207, 208 may be slanted to ensure that the animals are forced into single file (by way of the angled panels 205, 206 at the bottom) before passing through the magnetic field (near the top), as shown looking from the side in FIG. 4. The angled panels 205, 206 may also be slanted.

In other words at least one foot of the animal is within the structure (and thereby forced into single file) before the tag reaches the magnetic field. The side panels 207, 208 may be slanted looking from the side at between 20°-60° from vertical. For example, this slant may be 30° from vertical.

While in general the identification device may be on the animal's ear (e.g. an RFID ear tag), the antenna apparatus 1 may be reconfigured for other locations on the animal. For example if the identification device is lower on the animal the side panels 207, 208 may be slanted in the opposite direction and the angled panels 205, 206 may be provided at the top.

The angled panels 205, 206 may also be designed to avoid small animals passing through at the same time as larger animals eg: a lamb underneath the mother.

The "U" shape may also be described as a "V" shape or a truncated "V" shape or a frustoconical shape.

Figure 6:
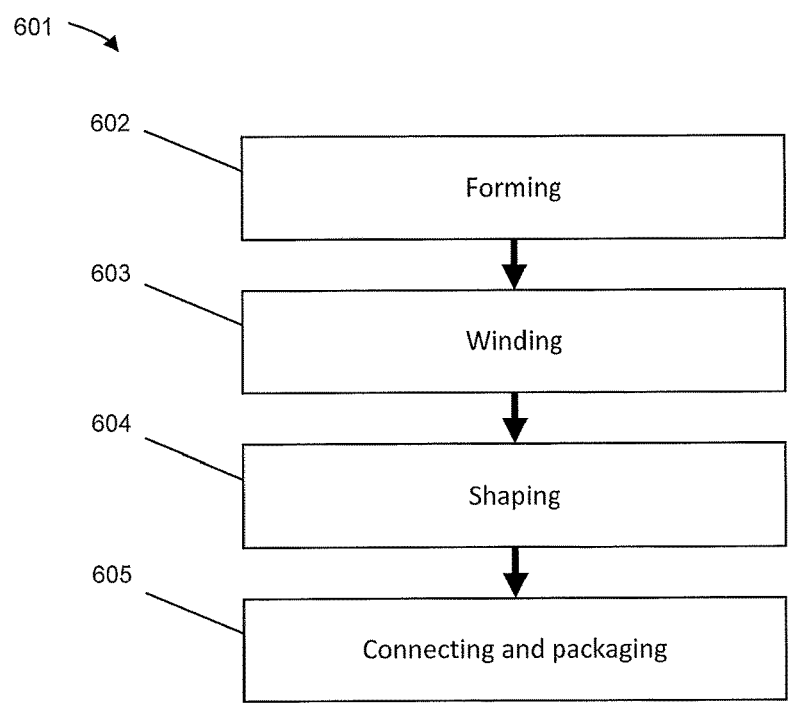
FIG. 6 is a flow diagram of a method of manufacturing.
Figure 7:
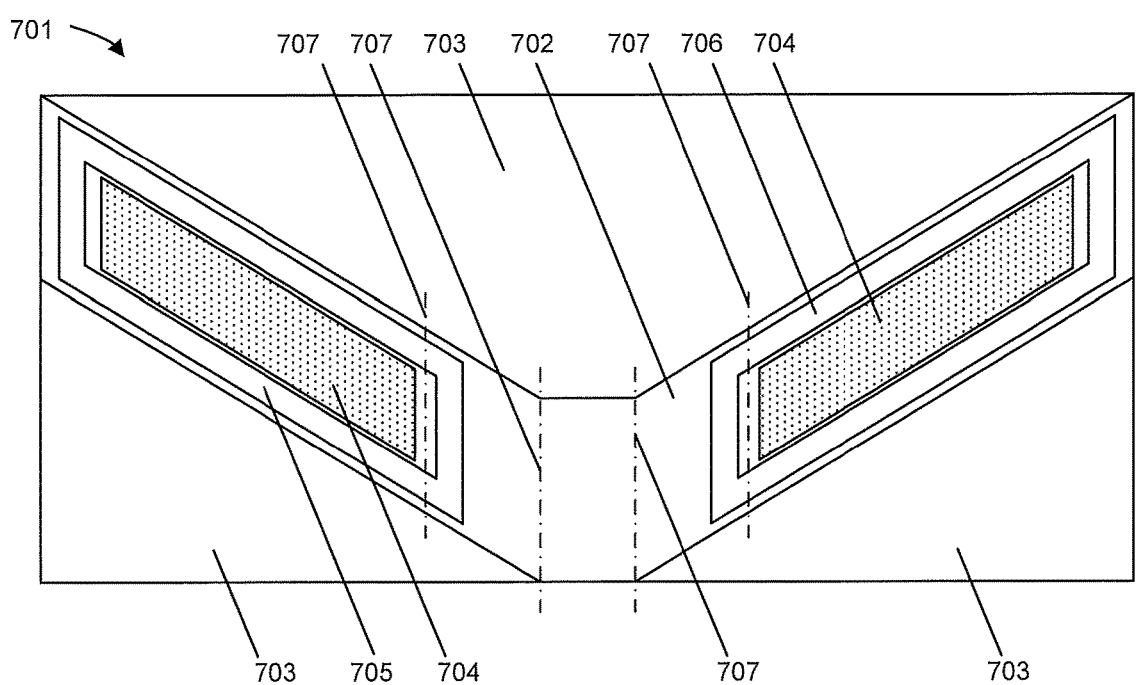
FIG. 7 is a plan view of a plastic blank during manufacturing.

The antenna apparatus 1 may be manufactured as shown in FIGS. 6 and 7. A method of manufacturing 601 includes forming 602 a plastic blank 702.

Then the electrical coils are wound 603 around formers in the plastic blank 702. The plastic blank 702 is then shaped 604. The shaped structure is then electrically connected to the controller 2 and packaged 605.

The forming 602 may relate to milling a flat plastic block 701 into a desired shape and profile features in order to create the plastic blank 702 shown in FIG. 7. Alternatively manufacturing techniques such as injection moulding, 3D printing, or fabrication may be used according to the requirements of the application. The plastic blank 702 may be constructed in sections which are then adhered or bonded together.

The plastic blank 702 may be polyvinyl chloride (PVC) plastic, with a thickness of 15-21 mm. Thicknesses outside this range may also be used, however the panels of the plastic blank 702 should be strong enough to withstand animal hoofs walking on them. Other construction materials may be used, including other types of plastics and timber. Milling may be performed using a computer numerical control (CNC) router. Several offset or opposed plastic blanks may be milled from a single sheet of material, in order to reduce wastage from offcuts 703. The plastic blank 702 may be made with a honeycomb structure 704 to reduce the weight of the resulting reader 2 by around 30%. The colour of the plastic blank 702 may be chosen to camouflage against the surroundings of the stock race 301. For example grey might be used to match in with concrete floors. As the floors of the stock race 301 gets dirty, so will the antenna apparatus 1. This camouflaging helps to reduce the chance of animals baulking as they approach the reader 2. Camouflaged anti-slip floor tape can be used when the reader 2 is on a dirt floor. Alternately, the bottom of the reader 2 may be slightly buried within the floors of the stock race 301 by a few centimeters.

Winding 603 may involve winding or securing the left coil 202 in left coil groove 705, and winding or securing the right coil 203 in right coil groove 706. The coils 202, 203 may be wound in an oval shape, trapezoid or circular shape. While the coil shapes may vary, the impedance of the coils 202, 203 should be maintained so that the reader 2 stays within the specification of the TX/RX input stage of the controller 3 in order to provide adequate impedance matching. The resistance of the coils 202, 203 may be varied in order to change the Quality Factor (Q) of the reader 2. The coils 202, 203 are made from Litz wire, a PCB track, a solid strand conductor or from some other conductor type. The coils 202, 203 may be wound using a winding machine or may be separately wound onto a former which is then attached to the plastic blank 702. The coils 202, 203 may then be secured using silicon rubber. Ferrite tiles may be used to further direct the electromagnetic field. Tuning capacitors, filters and EMI shielding may also be added. At this point the plastic blank 702 is still substantially flat.

Shaping 604 may involve bending at various places in the plastic blank 702 to create the U shape. The bend lines 707 are heated at around 120° C. for around 15-30 minutes prior to bending. An electronic strip heater, a hot air strip heater or a gas heater may be used for heating. The bend lines 707 are then folded in the desired shape using a jig on which the plastic blank 702 is placed when it is hot enough to bend. Pressure is applied to the hot plastic in order to bend it to the desired angle, and held until the piece is cooled to below 50° C. Water or wet cooling rags may be used to speed up the cooling process. As shown by bend lines 707 in FIG. 7, four lateral bends are made in the substantially flat structure. By maintaining accurate temperature control and even temperature distribution, burning and spotting of the piece may be avoided.

Connecting and packaging 605 may involve bonding a cover over the coils 202, 203 (this may also be done prior to forming). It may include terminating the coils 202, 203 to an electrical circuit or to an electrical connector. This may include a plug and cabling to the controller 3. A box may be attached to the outside of the reader 2 to accommodate additional reader electronics. The coils 202, 203 may be terminated to an electrical connector. The electrical connector may be partially recessed into the reader 2. Alternately, coil winding leads may exit a panel and be attached to an electrical plug. The coil winding leads may be protected by a conduit or a flexible tube.

The bonding process ensures that the antenna apparatus 1 is sealed and water resistant eg: IP56 rated. During bonding, the pieces of plastic being bonded may be plasticized and then completely mixed together in order to bond entirely. Silicon may be used around connectors to ensure there is no water ingress around cable entry points. The antenna apparatus 1 may be able to be chemically treated by disinfectant for bio-security purposes.

The controller 3 may be connected to a 12V power supply, such as a vehicle lead acid battery. The controller may be mounted to the stock races 301, 401 using screws or a supplied bracket. The antenna apparatus 1 may be an active reader and may use the coils 202, 203 for energizing the RFID tag as well as for receiving signals from the RFID tag. Upon receiving an excitation signal, the RFID tag may modulate the excitation signal in a full duplex methodology (FDX). Alternately, the RFID tag may store energy and/or data from the excitation signal in order to send a response at the appropriate time in a half-duplex methodology (HDX). The controller may store a unique ID from an RFID tag and may also store a timestamp. The antenna apparatus may be tuned or optimized to work with a number of RFID readers.

Due to the shape of the antenna apparatus 1 it may be easy to install into a standard non-metallic sheep race. By using the same reader interface 4 as presently available controllers use, installation is further simplified.

The antenna apparatus 1 may also have a standard serial I/O port as part of the additional interfaces 6. This may use open source protocols to promote integration with various software packages and additional devices 5, such as scales and data loggers.

To ensure that the impedance of the reader 2 is sufficiently matched with the controller 3, the reader 2 may be wound and/or tuned according to a winding specification. The reader 2 may have an impedance of 100 µH to 120 µH, or between 200 µH and 980 µH depending on the controller 3 used.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An apparatus comprising:
    a structure configured to mount within a stock race to permit animals to pass therethrough;
    two or more antenna coils attached to or within the structure configured to provide a magnetic field laterally across the structure, substantially in a zone through which an interrogatable identification device attached to each animal will pass; and
    a controller configured to receive an identification signal for each animal passing through the magnetic field based on an interrogation of each identification device passing therethrough;
    wherein the two or more coils comprise a coil attached to or within each side of the structure connected in a Helmholtz configuration; and
    the apparatus is without a transverse coil traversing above or below the zone through which the interrogatable identification device attached to each animal will pass.

2. The apparatus of claim 1 wherein the structure has an open top.

3. The apparatus in claim 1 wherein the structure comprises a base panel, angled panels extending from the base panel and side panels extending from the angled panels.

4. The apparatus in claim 3 wherein the base panel, angled panels and side panels form a U, V, truncated V, or frusto-conical shape when viewed from the front.

5. The apparatus in claim 4 wherein the shape is configured to ensure that the animals pass though the structure in single file.

6. The apparatus in claim 4 wherein the angled panel is angled at between 20° and 60° to the vertical viewed from the front.

7. The apparatus in claim 3 wherein the base panel, angled panels and side panels are slanted viewed from the side.

8. The apparatus in claim 6 wherein the slant is configured to ensure that at least one of the animal's feet are within the structure before the identification device passes through the magnetic field.

9. The apparatus in claim 7 wherein the side panels are angled at between 20° and 60° from the vertical viewed from the side.

10. The apparatus in claim 1 wherein the structure is configured to be substantially camouflaged with the stock race.

11. The apparatus in claim 1 wherein the structure is grey.

12. The apparatus in claim 1 wherein the structure comprises a honeycomb plastic.

13. A method of manufacturing an identification device reader for a stock race comprising:
   forming a flat structure;
   providing electromagnetic coils only in side panels of the structure; and
   shaping the structure into a U, V, truncated V or frustoconical 3D shape.

14. The method in claim 13 wherein the forming comprises milling a plastic blank into a predetermined configuration.

15. The method in claim 13 where providing coils comprises winding an electrical conductor onto the structure.

16. The method in claim 13 wherein the shaping comprises heating portions of the structure and bending it into the 3D shape.

17. An apparatus comprising:
   a structure configured to mount within a stock race to permit animals to pass therethrough; and
   two or more antenna coils attached to or within the structure configured to provide a magnetic field laterally across the structure, substantially in a zone through which an interrogatable identification device attached to each animal will pass; wherein the two or more coils comprise a coil attached to or within each side of the structure connected in a Helmholtz configuration, and wherein the structure has an open top and the apparatus is without a transverse coil to enable the structure to have the open top.

18. The apparatus in claim 17, wherein the structure has an open top, and wherein the structure comprises a base panel, angled panels extending from the base panel and side panels extending from the angled panels.

19. The apparatus in claim 18 wherein the base panel, angled panels and side panels form a U, V, truncated V, or frustoconical shape when viewed from the front.

20. The apparatus in claim 19 wherein the shape is configured to ensure that the animals pass though the structure in single file.

* * * * *